United States Patent
Sarbach

[15] 3,654,456
[45] Apr. 4, 1972

[54] APPARATUS FOR CONTROLLING CAR SPEED AT COUPLING

[72] Inventor: Ronald A. Sarbach, Columbus, Ohio
[73] Assignee: Westinghouse Air Brake Company, Wilmerding, Pa.
[22] Filed: Oct. 15, 1970
[21] Appl. No.: 80,939

[52] U.S. Cl. .................................................. 246/182 B, 340/1
[51] Int. Cl. ............................................ B61l 3/00, B61b 1/00
[58] Field of Search ................................................ 246/182 B

[56] References Cited

UNITED STATES PATENTS 3,463,919  8/1969  Da Rold et al. ...................... 246/182 B Primary Examiner—Arthur L. La Point
Assistant Examiner—George H. Libman
Attorney—Ralph W. McIntire, Jr.

[57] ABSTRACT

An automatic railway vehicle control system is provided by establishing local brake control of a free moving vehicle in a classification yard in accordance with the speed of the vehicle and the detection of a target car with which the moving car is to be coupled to thereby limit the coupling impact forces between the vehicles. Reception of reflected sonic signals within a predetermined period following emission of energy waves by a periodically sounded whistle provides an indication of a moving car being within a preselected distance of a target car. Should the moving vehicle be monitored as exceeding a preselected safe coupling speed upon reception of a predetermined number of the reflected signals, the system will function to effect a brake application which will remain in effect until the vehicle speed is reduced below the preselected safe coupling speed, at which point the system is reset, releasing brakes and allowing the car to roll into a soft coupling with the target car. Fore and aft sonic transmitters and receivers are provided on each car to permit universal car positioning. The system is adapted to control a cut of cars being classified, as well as individual car classification.

11 Claims, 11 Drawing Figures

INVENTOR.
RONALD A. SARBACH

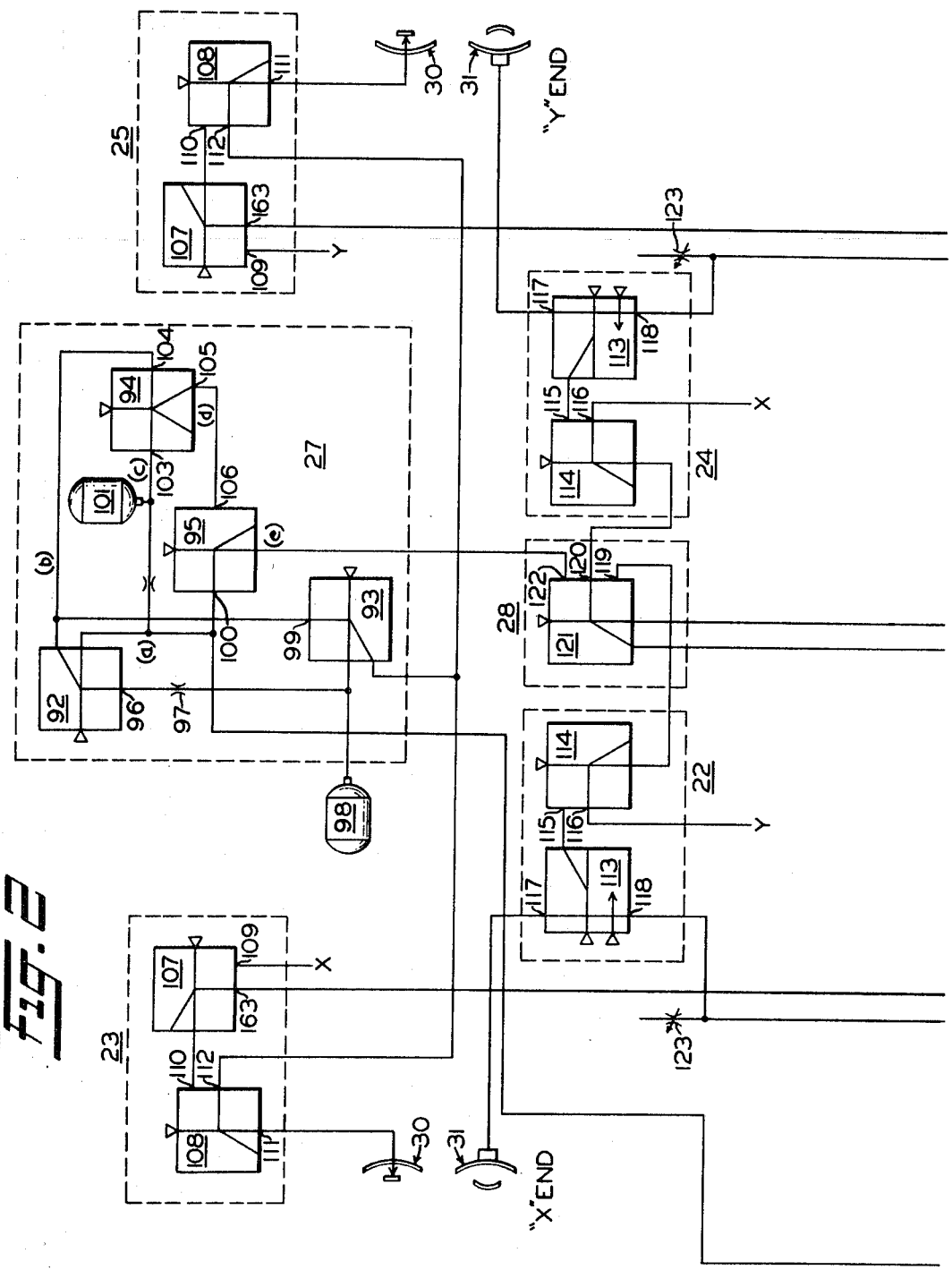

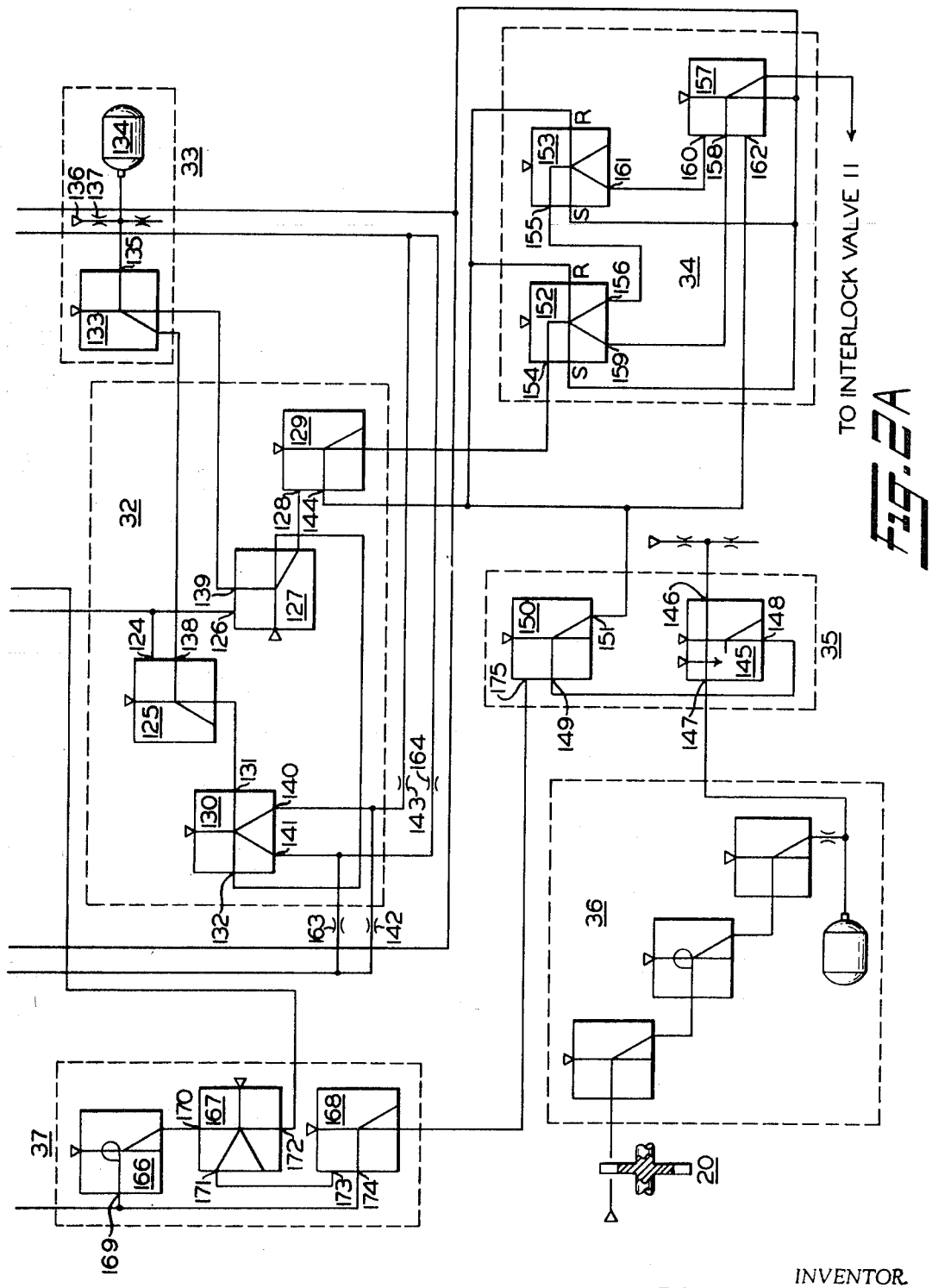

INVENTOR.
RONALD A. SARBACH
BY Ralph W. McIntire, Jr.
ATTORNEY

INVENTOR.
RONALD A. SARBACH
BY Ralph W. McIntire, Jr.
ATTORNEY

APPARATUS FOR CONTROLLING CAR SPEED AT COUPLING

BACKGROUND OF INVENTION

It is common practice and essential in the makeup of trains in classification yards to control the speed of free-rolling cars to limit impact forces at the time of coupling in order to protect the vehicles themselves from damage, and to also prevent damage to the vehicle lading. This latter damage occurs extensively in classification yard operations and constitutes a source of great expense to the railroads.

In a typical classification yard operation, a string of freight cars is continually pushed by a switcher or pusher locomotive over the crest of a "hump" in the yard, at which point a car or cut of cars may be successively separated from the string of cars. Having had their brakes previously released, the separated car or cut of cars is thus allowed to roll free down the "hump" under the influence of gravity. Various switches and track sections fanning out from the "hump" direct the cars to appropriate destination tracks for coupling with other cars already situated on the same destination track and with cars to be subsequently directed to that track section to thereby form a new string of cars having a destination along a common route. The grade and/or length of the "hump" is such that a free-rolling car of minimum size and load and subject to conditions creating maximum rolling resistance will obtain sufficient momentum to reach the farthest point of any of the several destination tracks. It becomes apparent that as the number of cars coupled on the destination tracks increases, progressively less momentum is required of the latter cars being classified as compared with the first cars due to the reduced distance which the cars must travel. Thus one or more trackside car retarders are employed in an attempt to limit the speed of the free-rolling cars by applying a braking force to the wheel flange as the car passes so that the car momentum at impact will not result in damage to either one of the vehicles being coupled or to their lading, but so that the momentum is still sufficient to assure the integrity of the coupling. If the retarder action is too severe, the car will stop short, thus imposing costly delays in the operation while a switcher locomotive is deployed to couple up the cars.

In addition to the varying distance the cars must free-roll to effect a coupling at the appropriate destination track, other variables, such as car weight, the type of commodity being carried, and the degree of vehicle load, as well as variances in rolling friction due to wheel/rail resistance, journal bearing resistance, wind resistant, etc. must be taken into account in an attempt to vary the retarder action accordingly. When operating the retarders manually, the degree of retarder control is left to the judgment of the operator, relying upon his skill and experience; however, due to the human element involved, this has proven to be an inadequate means of controlling vehicle movement to the degree necessary to avoid damaging impact forces as evidenced by excessive damage claims.

More recently, automatic retarder control has been implemented whereby data, which takes into account the varying conditions influencing the coupling speed of each vehicle, is compiled and fed into computers for determining the degree of retarder action to be taken. While these computerized systems do have advantages over the manual retarder control, they are by necessity more complex, are expensive in both initial cost and maintenance, are of such questionable reliability that manual retarder operators are still required for back-up purposes. Furthermore, classification yard operation is limited, whether the retarders are under manual or automatic control, by the fact that the location of the trackside retarders is fixed and consequently, until such time as the car passes through the retarder, the retarder is ineffective to apply a braking force to the car.

It is therefore the general object of the present invention to utilize the standard onboard brake control system of a railway vehicle for controlling its free-rolling movement in a railroad classification yard in accordance with such parameters as detection of another vehicle within a predetermined proximity and the vehicle speed exceeding a predetermined rate to bring the car into coupling engagement at a safe speed irrespective of such variable conditions as tend to affect the vehicle momentum at the time of impact.

It is another object of the invention to sense the condition where a vehicle within a predetermined range of detection is actually a vehicle coupled directly ahead of the vehicle in question, the receiver of which is consequently desensitized to reflected signals to prevent a brake application from inappropriately occurring.

It is an extension of the above object of the invention to provide means for activating the rearward facing transmitter when a brake application is produced on a vehicle so as to emit a signal for direct reception by the desensitized receiver of a vehicle which may be coupled therewith and thereby permit the desensitized receiver to operate to permit a brake application to occur on the car having the desensitized receiver so that each car may share in the braking.

It is still another object of the invention to provide such a self-contained vehicle control system utilizing pure fluid control system circuitry to take advantage of the inherent reliability and low maintenance characteristics attributed to such "fluidic" devices due to their having no moving parts other than the air medium itself and to further utilize the air supply normally available for operating the train air brakes.

SUMMARY OF INVENTION

In accomplishing these objects, the present invention, provides a pure fluid oscillator circuit serving as a time base pulse generator, the output of which intermittently drives a self-oscillating whistle in synchronism with the oscillator frequency. A parabolic reflector together with the whistle with which it is associated comprises an acoustic transmitter for emitting parallel sonic energy waves having a known wavelength. A pair of these acoustic transmitters are situated, one on each end of a railroad freight car, so as to emit sonic signals in opposite directions but in line with the direction of car movement for detecting a target car with which the car transmitting the signal is to be coupled. Also provided on each car, in proximity with the transmitters, is a pair of acoustic receivers similarly arranged with parabolic reflectors to receive sonic signals reflected from a target car. The receivers are each provided with a tuning tube selected so that any sonic signal having a wavelength other than the one being emitted by the transmitter will be rejected. This is accomplished by reason of the rejected wavelength being out of phase with incoming signals as they are reflected from the base of the tuning tube thereby destructively interfering with each other while the in-phase signals are reinforced by reason of a standing wave being formed in the tuning tube. Associated with the tuning tube is a pure fluid turbulence amplifier arranged so that its fluid power stream is disturbed by the accepted in-phase signals within the tuning tube. In this way only sonic signals of interest are recognized, reception of which signals is monitored by a detector gate conditioned by pulse shaping circuitry to be enabled only during a relatively brief period of time. This gating period is determined in accordance with the time required for sonic signals to be transmitted and reflected over a predetermined distance. If a signal reception is recognized during this gate period, a pulse signal is developed in synchronism with the frequency of the oscillator indicating that an object has been sensed with a predetermined range of detection of the vehicle being classified. The presence of this gated reception signal together with a signal from a rate detection circuit indicating vehicle speed in excess of a predetermined limit produces a pulse output for driving a binary counter, the purpose of which is to require a predetermined number of pulses to eliminate the possibility of either the gated reception signal or speed signal being spuriously received. Additional circuitry is provided to assure that the several required pulses are accumulated by the counter consecutively. The counter is reset if the signals are not received consecutively. The counter output at a predetermined count is acted upon to thus initiate a brake application signal, which causes the vehicle brakes to apply and provides a set input to each counter stage to lock in the brake application signal.

Timer means and associated logic circuitry are provided to sense the condition where the vehicle being classified becomes a trailing car coupled to another car in a cut of cars to be classified together. Under such conditions, the reception of a reflected sonic signal before expiration of a predetermined time delay causes a change in the bias level of the gate associated with the interruptable jet amplifier of the receivers which are consequently forced to assume a desensitized mode. In this condition, continued receptions of reflected signals from the car coupled directly ahead of the trailing one of a cut of cars are not recognized, the purpose being to prevent the trailing cars' brakes from being otherwise applied.

Logic circuitry initially arranged to disable the rearward facing transmitter and allow only the acoustic transmitter associated with the forward facing end of the vehicle to operate is enabled when a brake application signal is in effect to cause the rearward facing transmitter to operate, thus providing an indication rearward of the cars' brakes being applied.

In the desensitized mode, proximity of the trailing cars' forward facing receivers with the rearward facing transmitter of the car coupled immediately ahead of it, in a cut of cars, is such that operation of the rear transmitter on the head car when a brake application signal is produced thereon results in the reception signal on the trailing car being of sufficient intensity to overcome the insensitivity of its receiver. Upon reception of a predetermined number of signals, the trailing cars' brakes are applied, in turn initiating a signal to activate its rearward facing transmitter to overcome the insensitivity of the receiver of the next car in the cut etc., whereby each car in a cut of cars produces a brake application sequentially on command from the car coupled immediately ahead of it.

In the case of either a single car or a cut of cars being classified, when the brake application slows the rate of movement of the car(s) below the predetermined safe coupling rate, the brake application signal will disappear and be replaced by the normal brake release signal. The brake release signal will cause the brakes to release, allowing the car(s) to roll softly into a coupling engagement with the last previously placed car on the destination track, while at the same time, resetting the counter.

Direction sensing means is provided to produce signals corresponding to the direction a car is headed in the train for use by the various logic circuits, thus establishing which transmitter and receiver is designated as facing the forward going direction and which is designated as facing the rearward direction.

In one arrangement, the direction sensing is accomplished by a pure fluid logic circuit which is programmed to recognize the sequence of signals produced by a pair of interruptable jet amplifiers positioned relative to an interrupter vane driven by the car axle so as to have their power streams intermittently interrupted 90° out of phase as the vane is rotated in either direction.

In another arrangement, a sensing arm is arranged to engage a trackside trip causing the arm to be rotated in a direction depending upon the heading of the car. In either of the above arrangements, a pair of digital signals are produced to indicate which end of the vehicle is facing the direction of travel irrespective of its end-for-end placement on the track. These direction signals can also be utilized for automatically activating the system, if desired.

Interlock devices are provided to communicate the brake cylinder(s) with the car control valve associated with the standard AB type freight brake equipment in the conventional manner or with a supplemental reservoir which is charged from the brake pipe train line during normal operation. As long as brake pipe pressure is present and until a direction signal is received, the interlock devices function to establish control of brake cylinder pressure by the car control valve. Concurrent loss of brake pipe pressure, such as occurs when a string of cars are to be classified, and the presence of a direction signal, which is a function of the classification operation, results in control of brake cylinder pressure being switched to an application and release valve subject to the brake application and release signals from the counter. In response to a brake application signal being provided, fluid pressure stored in a supplemental reservoir is then connected to the brake cylinder(s), which pressure supply is terminated and the brake cylinder pressure exhausted to atmosphere when a brake release signal is subsequently effected.

In addition to the objects set forth, other objects, specific features and advantages of the invention will become apparent from the following more detailed description when considered in conjunction with the drawings in which:

FIG. 1 shows a preferred embodiment of the invention, partly in block form and partly diagrammatic including means by which the logic circuitry for generating the brake application and release signals during car classification is interfaced with the standard freight car brake control equipment;

FIG. 2 and FIG. 2A, when taken together, show a more detailed circuit diagrammatic of the pure fluid logic circuit portion of FIG. 1;

Figure 1:
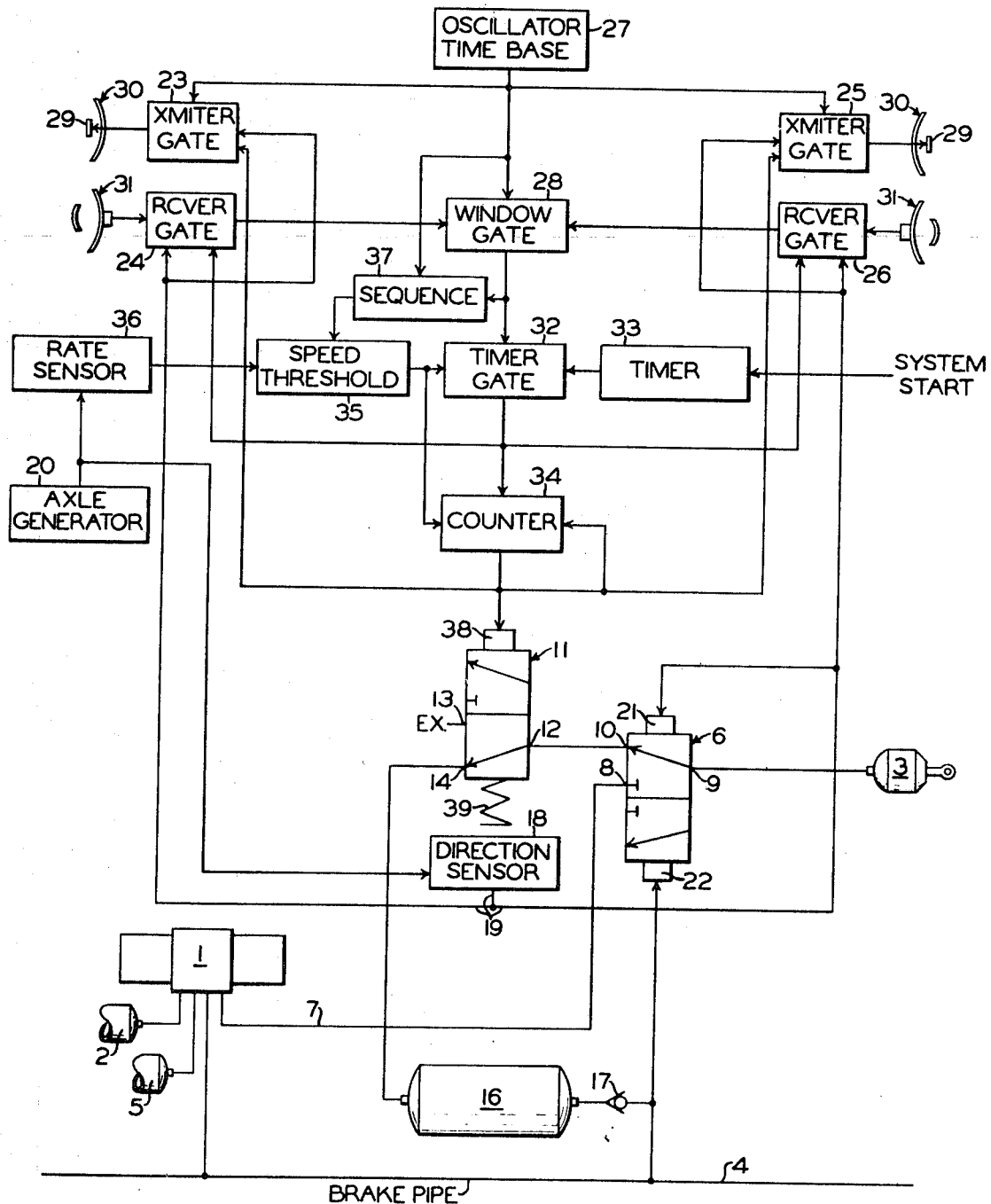

In FIG. 1 is shown a railway freight car brake control valve device 1 which may be of the standard AB type adapted to control the degree of fluid pressure communication between an auxiliary reservoir 2 and a brake cylinder device 3 when an automatic service brake application is effected by a service rate of reduction of fluid pressure carried in a trainlined brake pipe 4, which pressure reduction may be produced by manipulation of an operator's brake valve device (not shown) at a locomotive usually situated at the head end of a train in a manner which is well known to those familiar with train air brake control systems. In response to an emergency rate of brake pipe reduction, the control valve device 1 is effective to communicate fluid pressure in both the auxiliary reservoir 2 and an emergency reservoir 5 with the brake cylinder 3 to produce an emergency brake application. In response to recharging of brake pipe pressure, the control valve device 1 is caused to effect a direct release of the car brakes, as well as to effect the recharging of the auxiliary and emergency reservoir on each car in the conventional, well known manner, as explained in greater detail in instruction pamphlet No. 5062 titled the "AB" Freight Brake Equipment or instruction pamphlet No. 5062-16 titled "AB" Freight Brake Equipment with the ABD Control Valve, published Dec. 1945 and May 1965, respectively, by the Westinghouse Air Brake Company.

Interposed between control valve 1 and brake cylinder 3 is an interlock valve device 6 which is shown as a two-position, air piloted, three-connection spool valve. A line 7 connects the control valve 1 with a port connection 8 of the spool valve which is provided with a port connection 9 connected to brake cylinder 3. In one position of valve 6 as represented by the flow condition in the lower envelope, port connection 8 is connected to port connection 9, thereby placing control of brake cylinder pressure with the control valve 1. In the other position of interlock valve 6, as represented by the flow condition indicated in the upper envelope, port connection 9 is connected to a port connection 10 and port connection 8 is blanked.

An application and release valve device 11 is provided to control the supply and exhaust of brake cylinder pressure when the car is being classified, as hereinafter explained, and when valve 6 is positioned to effect the flow conditions indicated in the upper envelope of the valve diagrammatic. Valve device 11 is represented as a two-position, three-connection spool valve that is air-piloted in one direction to effect a brake release operation and spring-returned in the opposite direction to effect a brake application. A port connection 12 of valve 11 is connected to port connection 10 of valve 6. In release position of valve device 11, as represented by the flow condition of the upper envelope, port connection 12 is connected to a port connection 13 leading to atmosphere while a port connection 14 is blanked. In application position of valve device 11, as represented by the flow condition of the lower envelope, port connection 12 is communicated with port connection 14, which is in turn connected by line 15 to a supplemental reservoir 16. Reservoir 16 is charged via a one-way check valve 17 from the brake pipe 4 during the normal sequence of train operation; e.g., when a car is set into a train, or cars already connected in a train have their brake pipe consequently charged to the train line pressure such that all brakes are released and the car reservoirs are charged sufficiently to permit safe movement, the supplemental reservoir 16 will also be charged to the train line pressure.

Because of the universal end-for-end positioning of freight cars, a direction sensor 18 is necessary to establish which end of the vehicle is headed in the forward going direction of the train. In the preferred embodiment of the invention, as shown in FIG. 1, the direction sensor output 19 is a function of the sequence of signal pulses produced by an axle generator 20, as hereinafter explained. A pilot port connection 21 of valve device 6 is subject to this directional output 19, as provided by the direction sensor 18 while a pilot port connection 22 of valve 6 is subject to brake pipe pressure. During normal train operation, brake pipe pressure is present, usually at some value above approximately 50 p.s.i., while the direction sensor output 19 is absent by reason of the axle generator power input being withheld until the car classification operation is initiated. Consequently, valve device 6 is initially positioned to effect the flow conditions represented in the lower envelope in which position fluid pressure established by the car control valve device 1 and effective in line 7 is connected with the brake cylinder via port connections 8 and 9 of valve 6. During normal train operation, check valve 17 is effective to prevent the back flow of fluid pressure from the reservoir 16 to the brake pipe which will be subject at certain times to some reduced pressure below the pressure to which the reservoir is charged, such as when a service brake application is effected in accordance with the well known automatic freight brake control concept. Should an emergency brake application be initiated, resulting in depressurization of pilot port connection 22 due to complete venting of brake pipe pressure, valve device 5 will not shift since pilot port connection 21 will remain depressured, thereby assuring that brake cylinder pressure will remain under control of the car control valve device 1.

In a railroad classification yard, a string of cars to be classified is normally left with the car brake set, usually by reason of the locomotive being uncoupled from the cars so that the train line brake pipe pressure is exhausted. This complete venting of fluid pressure effective in brake pipe 4 effects an emergency brake application on each car by reason of the cars' control valve device 1 responding to such brake pipe venting to cause the fluid pressure in both the auxiliary reservoir 2 and the emergency reservoir 5 to flow into the brake cylinder 3 until equalization of fluid pressure therebetween occurs. Due to check valve 17, however, fluid pressure stored in supplemental reservoir 18 is prevented from back-flowing into the brake pipe 4, but remains charged to the pressure at which the brake pipe was initially charged. Prior to the string of cars being pushed by a switcher of pusher locomotive to the crest of the "hump" for classification, as will hereinafter be explained, a yardman releases the previously set brakes on each car by individually pulling the release rod associated with the car's brake cylinder release valve device (not shown). Operating the release valve device, which may be either the AAR approved QR type release valve usually associated with the standard AB control valve device or the release valve incorporated in the ABD control valve device, serves to release the car brake cylinder pressure without depleting the fluid pressure remaining in the auxiliary or emergency reservoirs 2 and 5 following equalization of fluid pressure therein with the brake cylinder 3. A detailed description and operation of the release valve portion of the ABD control valve may be found in previously mentioned instruction pamphlet No. 5062-16. A detailed description of a QR type release valve is provided in descriptive leaflet No. 2465-1, published in Oct., 1957 by the Westinghouse Air Brake Company, and titled QRR Brake Cylinder Release Valve.

After the brakes on each car of the string of cars to be classified have been released, a switcher locomotive is employed to push the cars at a relatively constant rate over the crest of the classification yard "hump" at some relatively constant speed, as dictated by the particular classification yard procedure. This speed, of course, must provide sufficient car momentum to assure that the car will roll to the farthest most point in the yard under the worst conditions of car rolling resistance. As each car passes over the "hump," a yardman manually operates the car's uncoupling lever to physically disconnect the car from the remaining string of cars, thereby permitting free movement of the separated car down the "hump" for disposition in any one of several new trains being made up on the various destination tracks.

As the separated car passes a preselected point at the crest of the "hump," it is monitored as to which end is facing the direction of travel. In FIG. 1, this function is represented by the direction sensor block 18, as previously mentioned. Output 19 of block 18 is effective at pilot port connection 21 of interface valve 6. Since brake pipe pressure normally effective at pilot port connection 22 is absent, by reason of the brake pipe being vented as previously explained, interface valve 6 is shifted to the position shown, in which position brake cylinder 3 is cut off from line 7 leading to the car control valve 1 and is connected to port connection 12 of the application and release valve 11. Fluid under pressure in reservoir 16 is thus connected to the brake cylinder or brake cylinder pressure is vented to atmosphere depending upon the position of valve 11.

Concurrently, directional output 19 is connected to a transmitter gate 23 and to a receiver gate 24 at one end of the car and is connected to a transmitter gate 25 and to a receiver gate 26 at the opposite end of the car so that only the forward facing receiver transmitter pair is initially conditioned for operation. An oscillator represented by block 23 controls the transmitter gates 22 and 25 as well as a window gate 28. Depending on car direction, one of the transmitter gates is enabled to produce an output for driving a self-oscillating whistle 29, causing intermittent tone bursts to be emitted in synchronism with the oscillator. These tone bursts are directed outwardly in the form of sonic energy waves by an acoustic transmitter 30, which includes a whistle 29, in order to continuously monitor the track and thereby sense the presence of a target car on the track ahead of the car whose whistle is sounding.

Reflected sonic signals picked up by an acoustic receiver 31 associated with whichever one of the receiver gates 24 or 26 correspond to the forward facing end of the car are passed to the window gate 28. The window gate input from the oscillator is conditioned so that the reflected signals must be received within an alloted time, indicating that a target car is sensed within a predetermined distance. During this period, reception of a signal will be passed to a timer gate 32.

Depending upon the state of the timer gate, as influenced by timer block 33, the output of the window gate will either pass through unaffected or the timer gate will produce a signal which causes the receiver gates 24 and 26 to go into a desensitized mode. The purpose of the timer 33 and timer gate 32 is to enable detection of the condition when the sensed target is the car coupled directly ahead of the car in question, such as when a cut of cars is being classified. In such a case, two or more cars are coupled together and are being classified as a group. The second car of such a group should not recognize the first as being a true target but should retain the ability to apply its brakes at the proper time. This is accomplished by requiring that a certain time interval expires before any reflected signal is received after the system has started searching in accordance with the transmitter gate 23 or 25 enabling its respective whistle 29. If a car is being classified singly or is the lead one of a cut of cars being classified, the time delay provided by timer 33 will normally have expired to allow subsequent receptions to be passed by timer gate 32 to the counter block 34. If the car in question is a trailing one in a cut of cars being classified, so that a signal is reflected off the car coupled directly ahead of it, and is consequently received before the timer expires, the receiver gates 24 and 26 are caused to assume a desensitized mode in which all but very strong reception signals are rejected, and will therefore not register a reflected signal, even from the car coupled directly ahead of it. The desensitized receiver will, however, remain sufficiently sensitive to respond to the rearward facing whistle of the car coupled directly ahead of it.

Also affecting passage of a signal by the timer gate 32 is a speed signal provided by a speed threshold block 35. A rate sensor block 36 responds to the digital output frequency of axle generator 20 to provide an analog signal, which at a predetermined level triggers the speed threshold as an indication of the vehicle speed exceeding a preselected rate.

Should the output of the speed threshold block 35 indicate that vehicle speed is below the preselected rate, the reception signal is blocked at the timer gate 32; however, if the speed threshold block output indicates that the vehicle speed is exceeding the preselected rate, then the timer gate will pass the reception signal to the counter block 34 in synchronism with the window gate signal.

The counter block requires reception of a predetermined number of signals to produce a brake application signal. Until a brake application signal is received, a brake release signal is effective.

A sequence block 37 is provided to assure that the counter inputs are consecutively received, thus preventing the possibility of a spuriously received signal causing a false brake application. This is accomplished by reason of the sequence block 37 acting through the speed threshold block 35 to generate a tentative counter reset signal and then destroying it each time a reception signal is passed by the window gate. If there is no reception signal, the tentative reset signal is allowed to become a real signal, consequently resetting the counter. As long as the required number of receptions are consecutively passed by the window gate and the timer gate to the counter, a brake application signal will occur. A feedback of the brake application signal locks in the counter and is connected to each transmitter gate 23 and 25 to override the directional inputs and cause both the forward and rearward facing whistles to be sounded. In this manner, intensity of the rearward whistle of the lead car is sufficient to overcome the sensitivity level of the desensitized receivers on the forward facing end of a car trailing another car in a cut of cars so that a brake application signal thereon is produced in the same manner as on the lead car. Sequentially, each car in the cut is caused to similarly produce a brake application signal and turn on its rearward facing whistle so that each car is apprised of a brake application being effective on the car ahead of it and in turn produce a brake application so that each car shares in slowing the cut of cars to a safe coupling speed.

The brake application signal being produced by counter 34 is effective at pilot port connection 38 of application and release valve 11, which pilot connection is depressurized to allow a spring 39 to move the valve to application position and thereby effect the flow conditions represented in the lower envelope of the valve diagram in which fluid pressure in reservoir 16 is communicated with brake cylinder 3 via port connections 14 and 12 of valve 11, and port connections 10 and 9 of valve 6 until fluid pressure equalization occurs between the brake cylinder and supplemental reservoir 16.

In consequence of brake cylinder force being thus developed, the rate of movement of the car or cut of cars will be retarded until the vehicle speed is reduced below the preselected safe coupling speed as detected by speed threshold 35. When this occurs, a signal is provided by the speed threshold to reset counter 34 to remove the brake application signal. Valve 11 is thus moved to its release position by reason of pilot port connection 38 being pressurized to overcome the force of spring 39. In this position, the flow connections represented in the upper valve diagram, effect a venting of brake cylinder pressure to atmosphere via port connections 9 and 10 of valve 6, and port connections 12 and 13 of valve 11. With the brakes now released, the car or cut of cars are free to roll slowly into a soft coupling with the target car from which the reflected signals are being received. Several brake applications and releases may be accomplished in the same manner during the total operation, but with progressively reduced brake force due to the reduced pressure in reservoir 16 following each brake application.

Figure 5:
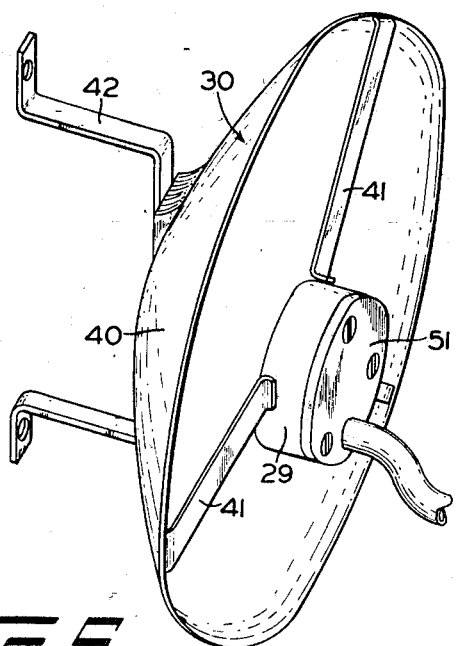
FIG. 5 is an axonometric view of the acoustic transmitter of FIG. 1.

As shown in FIG. 5, the whistle device 29 is arranged with a parabolic reflector 40 to form the acoustic transmitter 30 for generating sonic energy waves which are directed outwardly in a parallel beam by the reflector 40. The whistle device 29 is supported within the opening of the reflector by a plurality of suitably rigid straps 41 so that the point of emission of the sonic signal is located at the focal point of the reflecting parabola 40. Straps 41 may be formed so as to be conveniently attached to the whistle at one end and to the inner surface of the reflector at the opposite end, as for example by screws or by spot welding. Attached to the external back side of the reflector 40, as by welding, is a mounting bracket 42, by which means the transmitter assembly may be appropriately secured at each end of a railway vehicle. Cushioning means (not shown) may be suitably employed with the mounting brackets to dampen vehicle induced shocks, vibration, and other mechanical interference from the reflector if found to be a necessary requirement.

Figure 8:
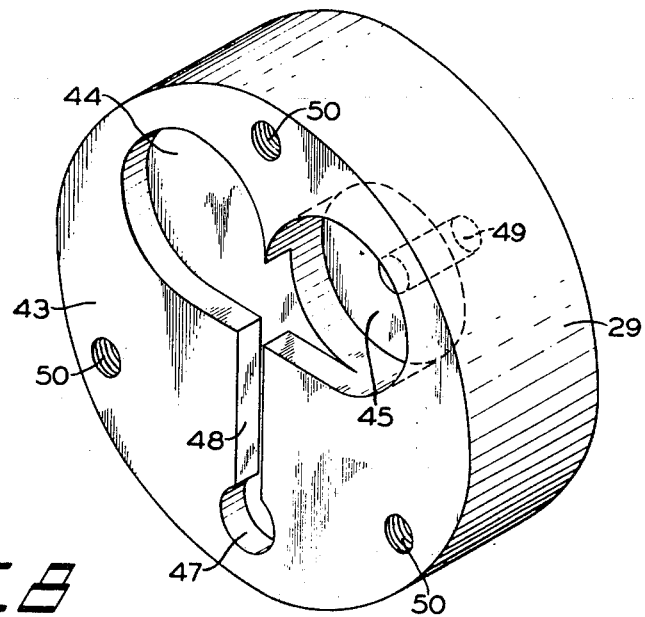
FIG. 8 is an axonometric view of a self-oscillating whistle device comprising a portion of the transmitter of FIG. 5, with its cover plate removed to show the internal configuration.
Figure 9:
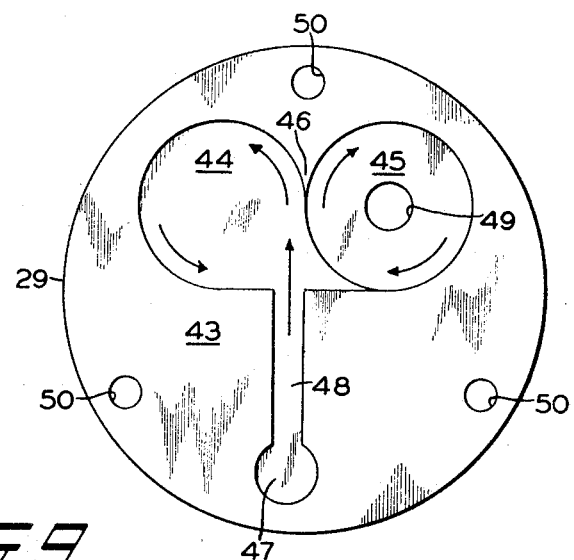
FIG. 9 is a front elevation view of the whistle of FIG. 8 illustrating the fluid blow paths through which the air flow is forced to alternately follow.

The whistle device 20 consists of a base block 43, FIGS. 8 and 9, having a pair of substantially cylindrical channels 44 and 45 milled or otherwise formed therein. Channels 44 and 45 are relatively situated in such proximity that their side walls intersect to form a sharply converging splitter 46 and to further provide an opening between the channels to accommodate fluid pressure communication therebetween. An inlet port 47 is connected to a passage 48 which opens into the chamber formed by channels 44 and 45 at a point transverse of, and slightly offset from, splitter 46. An output port 49 is provided at the base of channel 45 which is of greater depth than channel 44. A plurality of spaced, screw-threaded openings 50 are provided to receive appropriate screws for securing a cover plate 51 to the base 43, as seen in FIG. 5.

A conventional fluidic type fitting is screw-threaded into a corresponding tapped opening in the cover 51 in alignment with inlet port 47 to receive standard type tubing through which fluid pressure at the appropriate fluidic level is supplied. From inlet port 47, the fluid power input is directed via passage 48 into channel 44 where it is redirected by splitter 46 and the cylindrical side wall of channel 44 into a counterclockwise flowing vortex, as graphically represented by the arrows of FIG. 9. The vortex air flow thus established in channel 44 is caused to impinge upon the power stream issuing from passage 48 in a direction substantially normal to the power stream. The momentum interchange of fluid pressure occurring at this point deflects the power stream to the right of splitter 46 to establish a clockwise flowing vortex in channel 45. Once the air flow is forced to the right hand side of splitter 46, the vortex flow of air previously circulating within channel 44 is dissipated whereby the momentum interchange of air flow in channel 44 with the power stream is reduced. During this period of reduced vortex flow in channel 44, however, a portion of the air flowing in channel 45 is discharged via outlet port 49 and the remainder impacts with the power stream which is thereby urged to flow to the left hand side of the splitter and to recirculate in the preferred channel 44, thus completing one cycle of oscillation, the frequency of which is basically dependent upon the length of the feedback path provided by channel 44 and the input pressure employed. In consequence of the rapid oscillatory action of pressure discharged at the outlet port, a highly efficient whistle sound is emitted.

The sound emitted by whistle 29 is utilized to provide the required acoustic signal transmission by locating the whistle device 29 within the opening of parabolic reflector 40 so that the output port 49 of the whistle is situated at the focal point of the parabola. Since the output port 49 is relatively small, it acts like a point source of sound issuing at the focal point of the parabola. Advantage is taken of the well known characteristic of a parabolic structure in that any source of energy situated at the parabola focal so as to direct a signal to the parabolic surface is reflected or redirected in the form of an outgoing parallel beam. Another useful characteristic of a parabolic structure is that the distance from the focal point to the parabolic surface and outward to a plane perpendicular to the axis of the parabolic is constant irrespective of the path, so that all outgoing sonic signals emitted by whistle 29 and reflected from the parabolic reflector 40 are in phase. With the reflector thus designed in the form of a parabola, a coherent, parallel sonic beam is transmitted outwardly along the axis of the reflector.

Somewhat similar in construction to the acoustic transmitter 30 is the acoustic receiver 31 in that parabolic reflector 52 is provided to receive acoustic signals. Associated with reflector 52 is a smaller parabolic reflector 53 suspended by a plurality of straps 54 from reflector 52 so as to be located within the opening of, and in opposing relation to, reflector 52 so that the separate reflectors share a common focal point. A cylindrical tuning tube 55 is provided with a closed back end 56 which, if desired, may be made adjustable to vary the length of the tube. The tuning tube 55 is coaxially disposed at the rear of reflector 52 with its opposite end opening into the face of reflector 52. Bonded or otherwise secured across the opening of the tuning tube is a thin, extremely sensitive diaphragm 57 adapted to vibrate in sympathy with sonic energy waves impinging on it so as to pass sonic signals without degradation while screening out the effects of wind currents in the tuning tube. Also associated with the tuning tube 55 is a fluidic turbulence amplifier jet sensor arrangement comprising an emitter tube 58 and a collector tube 59 aligned transverse of the tuning tube 55 so that a maximum degree of fluidic pressure directed across an air gap between the emitter and collector tubes within the tuning tube will be normally recovered by the collector, provided the fluidic jet stream remains in a laminar flow condition. If the flow across the air gap is caused to break into turbulence, the degree of fluid pressure recovery by the collector tube will be consequently reduced. A mounting bracket 60 is arranged on the back side of reflector 52 securing the receiver 31 to each end of a railway vehicle similar to the manner in which the transmitter is mounted.

The parabolic reflector 52 is adapted to receive and reflect sonic energy waves toward its focal point, which waves are in turn reflected by the parabolic reflector 53 onto the diaphragm 57. Since the reflectors 52 and 53 share the same focal point, the signals reflected from reflector 52 pass through the common focal point. Consequently, the reflected signals directed toward reflector 53 appear to emanate from a point source at its focus, resulting in a coherent, parallel beam of sound signals being reflected in the original direction of the beam picked up by reflector 52 so as to impinge upon diaphragm 57. The total energy contained in the original sonic beam is not concentrated into a beam corresponding to the size of the smaller reflector 53, whereby the energy density or the loudness of the signal is increased in inverse proportion to the ratios of the effective areas of the reflectors 52 and 53.

The intensified signal impinging upon diaphragm 57 causes the diaphragm to vibrate, thereby creating sound waves within the tuning tube 55. The length of the tuning tube is selected in accordance with the known wavelength of the acoustic signals being received so that the incoming waves are reflected in such a manner as to reinforce the incoming waves by reason of their being in resonance. Consequently, a standing wave is formed by the well known phenomenon of wave interference, the characteristic feature of which is that of incoming and reflected waves traveling through the same medium at the same time acting upon each other to cause maximum disturbances of the medium at certain locations of the wave, while at other places, the medim remains quite undisturbed. It is at this point of maximum wave disturbance where the emitter and collector tubes 58 and 59 are located to direct a jet stream transverse of the tuning tube. The point of maximum disturbance has been found from experience to vary as much as one-quarter of a wave length, depending upon the length to diameter ratio of the tuning tube, thus giving evidence of the need for adjusting the length of the tuning tube for the strongest possible wave disturbance.

The interruptable jet amplifier arrangement comprising emitter 58 and collector 59 is adapted to sense a signal reception of the desired frequency by reason of the flow stream between the emitter and collector being acted upon by the disturbed medium of the tuning tube. Incoming waves of frequencies other than the frequency of interest to which the tube is tuned are neither reinforced by resonance nor does their point of maximum disturbance occur where the emitter and collector of the interruptable jet sensor is located. Consequently, the level of disturbance of the medium at the point of the jet sensor resulting from received signals of undesired frequency is substantially less than the intensity of disturbance to which the interruptable jet sensor is capable of detecting. Thus, the signals received are continuously monitored by reason of the interruptable jet sensor arrangement to sense when a signal of interest is received, while discriminating against unwanted signals. Under quiet conditions, i.e., when there is no signal being received corresponding to the frequency to which the receiver is tuned, the normally laminar flow of low fluidic pressure from the emitter tube 58 across the air gap to the collector tube 59 is undisturbed so that substantially full pressure recovery is accomplished at the collector. On the other hand, the sensitivity of the jet stream across the air gap is such that when the jet stream is impinged by an acoustic disturbance of sufficient energy to cause the normally laminar flow to break into at least partial turbulence, the pressure capable of being recovered by the collector tube 59 is reduced and consequently, provides an indication of a signal reception having occurred. The intensity of the signal reception will cause the degree of turbulence to vary so that the pressure recovery of collector tube 58 will proportionally vary to indicate the degree of intensity of the received signal. The manner in which this indication of a signal reception and the intensity of the received signal is utilized in the system will be hereinafter explained.

Figure 3:
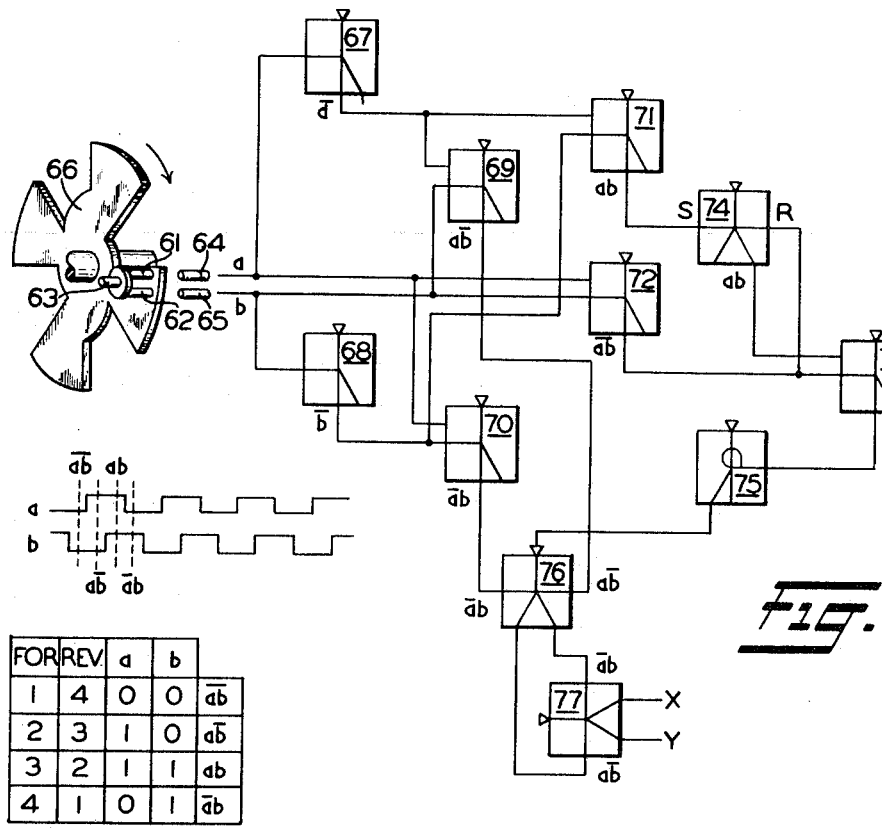
FIG. 3 shows a pure fluid circuit diagrammatic of the direction sensor block of FIG. 1.

In a preferred embodiment of the invention, direction sensor block 18, as shown in FIG. 3, comprises a logic circuit consisting of a plurality of pure fluid elements arranged to respond to the sequence in which the fluid flow condition between a pair of interruptable fluidic jet sensors *a* and *b* have their flow streams interrupted. The jet sensors *a* and *b* consist of emitter tubes 61 and 62 having a common supply pipe 63, and collector tubes 64 and 65, each spaced apart from a corresponding one of the emitter tubes so as to provide an air gap in which an axle mounted disc 66 is rotatable. Disc 66 is provided with a series of equally spaced vanes which are adapted to alternately interrupt fluid flow communication between each of the jet sensors *a* and *b* which are offset relative to each other so that the square wave pulse trains generated at sensors *a* and *b* in consequence of rotation of the disc 66 are 90° out of phase, as shown in the waveform diagram associated with FIG. 3. The interruptable jet sensors and vaned disc 66 comprise the axle generator represented by block 20 in FIG. 1. By reason of the jet sensors *a* and *b* providing two variables, four logic output combinations thereof are possible. Assuming that the axle generator is in the position shown, in which disc 66 interrupts fluid flow between both of the jet sensors *a* and *b*, and that the disc is rotating in the forward designated direction, as indicated by the arrow, the sequence of logic conditions of *a* and *b* is $\overline{ab}$, $a\overline{b}$, $ab$, $\overline{a}b$, $\overline{ab}$, etc. Assuming that the disc is rotating in the opposite direction from the same starting position, the sequence becomes $\overline{ab}$, $\overline{a}b$, $ab$, $a\overline{b}$, $\overline{ab}$, etc. The logic sequence of occurrence of the combination of *a* and *b*, depending upon the flow condition established by the position of disc 66, is represented in the accompanying truth table, also associated with FIG. 3, for both the forward and reverse designated direction of rotation of disc 66 corresponding to the different directions a railway freight car may be set on the track for movement in the direction of travel.

In the logic circuit, a NOR element 67 is arranged with its single input connected to collector 64 of interruptable jet *a* and its connected output being provided by the NOR leg, which is pressurized in the absence of an input to provide a logic signal $\overline{a}$. Similarly, NOR element 68 is arranged with its single input connected to collector 65 of interruptable jet *b* and its connected output being provided by the NOR leg, which is pressurized in the absence of an input to provide a logic signal $\overline{b}$. One input of a NOR element 69 is connected to the output of element 67, its second input is connected to collector 65 of interruptable jet *b*, and its connected output is provided by the NOR leg, which is pressurized in the absence of both inputs to provide a logic signal $a\overline{b}$. Another NOR element 70 is arranged in the circuit with one input connected to the output of element 68, with the other input connected to collector 64 of interruptable jet *a*, and with its connected output being provided by the NOR leg, which is pressurized in the absence of both inputs to provide a logic signal $\overline{a}b$. Another NOR element 71 is provided with one input connected to the output of element 67, the other input connected to the output of element 68, and an output at the NOR leg which is pressurized when both inputs are absent to produce the logic signal $ab$. Still another NOR element 72 is provided with one input connected to collector 64 of interruptable jet *a*, the other input connected to collector 65 of interruptable jet *b*, and an output at the NOR leg which is pressurized in the absence of both inputs to produce the logic signal $\overline{ab}$.

It is now apparent that the four possible logic combinations of *a* and *b*, as defined in the truth table, are established by the outputs of elements 69, 70, 71 and 72. In operation, let it be assumed that the vehicle on which axle generator 20 is operable is set on the track so that movement in a given direction will cause disc 66 to rotate in the direction of the arrow. The four possible logic combinations of *a* and *b* will thus occur instantaneously in the sequence as shown in the truth table under the heading "for." Since fluid flow communication between the jet sensors *a* and *b* is interrupted in the shown position of the disc 66, as represented in position (1) of the truth table, elements 67 and 68 will each produce an output to cause elements 69, 70, and 71 to be disabled. At the same time, element 72 is caused by the absence of both inputs to pressurize its NOR leg, which is in turn connected to one input of a NOR element 73 and to the reset input R of the flip-flop device 74. Since the opposing set inputs of element 74 are connected to the output of element 71 and thereby depressurized, element 74 is switched to depressurize its output connected to the other input of element 73, which however, is disabled by reason of its one input being pressurized by element 72 so that its connected output at the NOR leg is also depressurized. It will be seen later that the output of element 73 will become pressurized when the output of elements 72 as well as 74 is absent to provide a logic signal of either $a\overline{b}$ or $\overline{a}b$. The output of element 73 is connected to an OR element 75 arranged to produce a "one-shot" output at its OR leg when an input is present. Since its input at this point is absent, the output of the one-shot element 75 is also absent and a flip-flop device 76 having its power supply connected to the output of the one-shot element 75 is consequently caused to assume a passive condition in which neither one of its connected outputs is present. This leaves a final flip-flop device 77 in its set state, as determined by its previous input condition.

Now when the disc 66 moves to the next logic position, as represented in the truth table as logic position (2) fluid flow communication will be established at the interrupter jet *a* while the condition of interrupter jet *b* remains unchanged. Element 67 is consequently disabled so that both inputs to element 69 are absent and its output is thus pressurized indicative of logic condition $a\overline{b}$ being established. The output of element 69 is connected to one input of flip-flop 76 while its opposite input, which is connected to the output of element 70, remains depressurized. At the same time, previously enabled element 72 which had been holding element 73 in a disabled condition, becomes disabled, thereby removing the reset input R at element 74 and allowing the output of element 73 to be pressurized. One-shot 75 is consequently triggered to momentarily provide the power supply to element 76 which is used as a steering gate to reproduce the signal $a\overline{b}$ provided by element 69. Before the one-shot element 75 resets and flip-flop 76 becomes passive by reason of its power supply being removed, flip-flop 77 is set by the $a\overline{b}$ output of flip-flop 76 to produce output X indicating that the "X" designated end of the vehicle is facing the direction of vehicle travel.

As movement of disc 66 continues so that fluid pressure communication is next established between interruptable jets *a* and *b*, as represented in position (3) of the truth table, the output of element 68 becomes depressurized so that when combined with the previously and still depressurized output of element 67 at the inputs of element 71, the output of element 71 becomes pressurized. The output $ab$ of flip-flop 74 is thus pressurized by reason of its set input being pressurized to thereby disable element 73. Consequently, flip-flop 76 is forced, by reason of its power supply being absent, to remain in a passive condition whereby flip-flop 77 remains in its previously set condition in which output X is pressurized.

As movement of disc 66 continues in the same direction so that fluid pressure communication between interruptable jet sensor *a* is interrupted, as represented in position 4 of the truth table, the output $\overline{a}$ of element 67 is pressurized, thus presenting an input to element 71, the output of which is thus depressurized to remove the set input to element 74, whose output $ab$, however, remains pressurized to consequently maintain element 73 in a disabled condition. As the same time, loss of signal pressure from interruptable jet sensor *a* results in element 70 being enabled, its output signal being effective at input $\overline{a}b$ of flip-flop 76 while input $a\overline{b}$ is absent. Since flip-flop 76 is in a passive condition, however, it presents no output and flip-flop 77 remains in its previously set conditions in which output X is pressurized, indicating that the "X" defined end of the vehicle is facing the direction of vehicle travel.

One cycle of operation of the logic circuit is completed when disc 66 rotates sufficiently to again establish the logic condition $\overline{ab}$ by reason of fluid pressure communication being interrupted between jet sensors *a* and *b*. This causes output $\overline{ab}$ of element 72 to be pressurized to reset flip-flop 74 and thus remove the disabling input to element 73 so that one-shot element 75 can be triggered and flip-flop 76 again momentarily activated to set flip-flop 77 in accordance with pressurization of output $a\overline{b}$ of element 69 or output $\overline{a}b$ of element 70 depending upon which element 69 or 70 is first pressurized following reset of element 74. This cycle of operation is continuously repeated as long as the disc 66 rotates in the same direction to maintain the presence of directional signal X.

It will be seen from the truth table that when a vehicle is situated so that its movement in the given direction sets up rotation of disc 66 in a direction opposite the arrow, the sequence of logic conditions established by interruptable jet sensors a and b occurs, as shown under the heading "REV" in the truth table. It is therefore apparent that logic condition $\bar{a}b$, as established in position 1, now occurs prior to logic condition $a\bar{b}$, which is established in position 3. As flip-flop 76 is momentarily activating each cycle, the presence of input $\bar{a}b$ thereat will steer its output to the $\bar{a}b$ input of flip-flop 77 whose output Y is accordingly pressurized indicating that the "Y" defined end of the vehicle is facing the direction of travel.

Each output X and Y of flip-flop 76 is connected in parallel to pilot port connection 21 of interface valve 6 (FIG. 1). Also, signals X and Y are connected to the transmitter and receiver gates associated with each end of the car. The receiver gate associated with the forward end of the vehicle is conditioned by the directional signal to be responsive to reception signals, while the receiver gate associated with the opposite end of the vehicle is locked into a condition in which it is prevented from responding to reception signals. In a similar manner, the transmitter gates are initially conditioned so that only the forward facing whistle is sounded until a brake application signal occurs.

Figure 4:
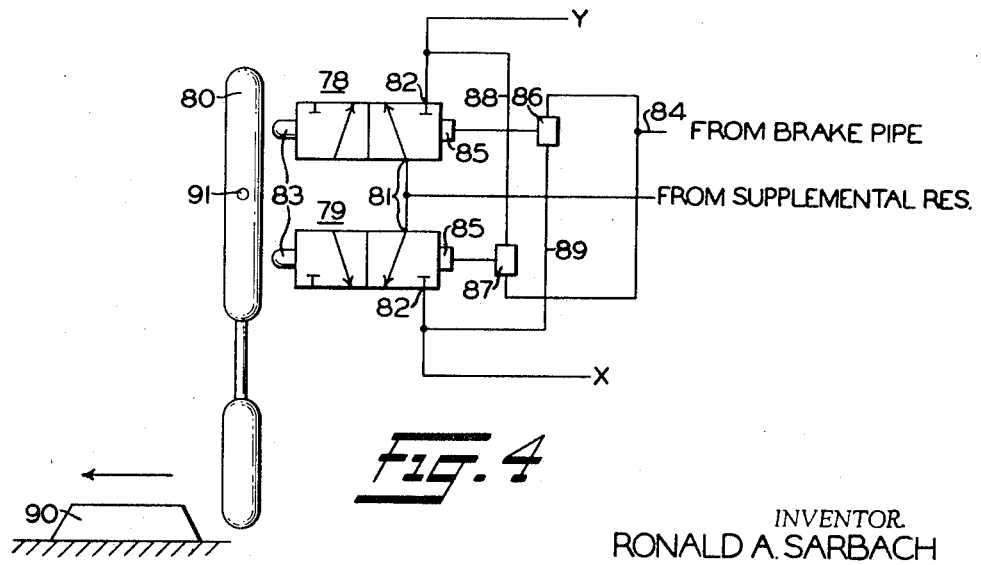
FIG. 4 shows an alternate arrangement for providing the direction sensing function as represented by the direction sensor block of FIG. 1.

Shown in an alternate arrangement of the direction sensor circuit of block 18 is a spool valve arrangement, FIG. 4, comprising a pair of two-position, two-connection spool valve devices 78 and 79, one or the other of which is adapted to be operated by a car mounted trip arm 80, depending upon which end of the vehicle is facing the direction of travel, as indicated by the arrow. Each spool valve device 78 and 79 is provided with a supply port connection 81 having fluid pressure communication with supplemental reservoir 16, and a delivery port connection 82 for providing a fluid pressure signal indicative of which end of the vehicle is headed in the forward facing direction. Each spool valve device 78 and 79 is Shown in an alternate arrangement of the direction sensor circuit of block 18 is a spool valve arrangement, FIG. 4, comprising a pair of two-position, two-connection spool valve devices 78 and 79, one or the other of which is adapted to be operated by a car mounted trip arm 80, depending upon which end of the vehicle is facing the direction of travel, as indicated by the arrow. Each spool valve device 78 and 79 is further provided with a mechanical operator 83 for positioning the spool valve in an operative condition in which the flow connections represented graphically in the left hand envelope are established. A control line 84 connects brake pipe 4 to a pilot operator 85 of valve 78 via one side of a double check valve device 86 and to a pilot operator 85 of valve 79 via one side of a double check valve device 87. Each pilot operator 85, when pressurized, forces its respective valve 77 or 78 to a normal non-operative position, as illustrated graphically by the flow connections in the right hand envelope. Delivery port connection 82 of valve 78 is connected by a branch line 88 to pilot operator 85 of valve 79 via the opposite side of double check valve 87 while delivery port connection 82 of valve 79 is connected by a branch line 89 to the pilot operator 85 of valve 78 via the opposite side of double check valve 86.

During charging of the brake equipment fluid pressure developed in the brake pipe is connected from control line 84 to pilot operators 85 of the valves 78 and 79 via the respective double check valves 86 and 87. Consequently, each valve 78 and 79 is positioned, as shown, in its non-operative position in which fluid pressure communication between supplemental reservoir 16 and delivery port connection 82 is interrupted.

During the classification yard operation when brake pipe pressure is exhausted, as explained in the "Background of Invention," fluid pressure is likewise exhausted from the respective spool valve pilot operators 85 via double check valves 86 and 87, line 84, and the brake pipe 4 so that spool valves 78 and 79 are each free to be repositioned in accordance with operation of their respective mechanical operators 83. As the car rolls free or is pushed in the direction of the arrow past a trackside trip mechanism 90, which is strategically placed in proximity of the classification yard "hump," the trip arm 80 engages the trip mechanism 90 and is consequently rotated about a pivot pin 91 in a counterclockwise direction, as viewed in the drawing. Mechanical operator 83 of spool valve device 79 is thus actuated, forcing its spool valve to shift to an operative position and effect the flow connections, as illustrated in the left hand envelope, whereby fluid pressure effective in the supplemental reservoir 16 and at supply port connection 81 is communicated with delivery port connection 82 of valve 79. Fluid pressure effective at port connection 82 of valve 79 provides a signal X indicating that the "X" defined end of the vehicle is facing the direction of travel. This signal is also effective at pilot operator 85 of valve 78 via branch passage 89 and double check valve 86 to prevent valve 78 from being moved out of its normal, non-operative position.

On the other hand, placement of the car on the track so as to be reversed end-for-end results in the trip arm 80 being rotated in a clockwise direction when engaged by the trackside detector 90 in consequence of movement of the vehicle in the direction indicated by the arrow. Accordingly, valve 78 is actuated to its operative position in which reservoir supply pressure port 81 thereof is communicated with port 82 to provide a fluid pressure signal Y indicative of the "Y" designated and of the vehicle being headed in the direction of travel, and to lock spool valve 79 in its non-operative position by reason of its pilot operator 85 being pressurized via branch line 89 and double check valve device 87. As long as the actuated spool valve devices 78 or 79 remain in an operative condition, the appropriate directional signals provided thereby will remain in effect.

As previously mentioned relative to the directional output signals provided by the preferred embodiment of the direction sensor block 18, the outputs X and Y are connected in parallel to pilot operator 21 of interface valve 6, as well as to the appropriate transmitter and receiver gates associated with the opposite ends of the vehicle, as hereinafter explained.

When brake pipe pressure is restored, by connecting a locomotive to the string of cars coupled on the destination track following classification, so as to recharge the brake pipe to the normal running pressure in the usual manner, pilot operators 85 of spool valves 78 and 79 are again pressurized, resetting the spools in their non-opeerative position, in which delivery ports 82 are cut off from supply at ports 81. By reason of the fluidic devices to which signals X and Y are connected in the system circuitry requiring a constant flow of air, it will be apparent that signals X and Y are no longer effective, being dissipated via the fluidic elements.

Directional signals X and Y, whether developed by the logic circuitry of the preferred embodiment of FIG. 3 or the spool valve arrangement of the alternate embodiment of FIG. 4, may also be utilized as a system start signal for activating the system by initiating the timer 31 (FIG. 1) and by turning on the air supply for the fluidic control circuit components which form the heart of the classification control system, as now explained.

The description and operation of the system is covered in detail with reference to the circuit diagrammatic of FIG. 2 which corresponds to the block diagram portion of FIG. 1 represented by the transmitter gates 23 and 25, receiver gates 24 and 26, oscillator 27, window gate 28, timer 33, timer gate 32, axle generator 20, rate sensor 36, speed threshold 35, sequence control 37, and counter 34. Assuming a car being classified has been pushed to the crest of the classification yard "hump," as previously explained, the system must be activated by cutting in a supply of low fluid pressure suitable for operation of the pure fluid elements comprising the control circuitry. Along with this requirement is the requirement to provide a supply of low fluid pressure to timer 33. In addition to the possibility of utilizing the outputs provided by the circuitry of either FIG. 3 or FIG. 4 to fulfill these requirements, it is to be understood that other conventional means are available for activating the system by providing the above mentioned air supply functions.

The oscillator circuit 27 provides the system time base function and comprises pure fluid OR/NOR elements 92 and 93, a pure fluid flip-flop device 94, and a pure fluid NOR element 95. Elements 92 and 93 provide the basic oscillator action while elements 94 and 95 produce a signal conditioning function. Connected to input 96 of element 92 via a restrictor 97 is a timing volume 98 which is charged from the NOR leg of element 93 in the absence of a signal at its input 99. When timing volume 98 is charged with fluid pressure sufficiently to cause the signal at input 96 to switch the output of element 92 from its NOR leg to its OR leg, a signal is presented to input 99 of element 93, causing it, in turn, to switch states. Consequently, the OR output leg of element 93 is pressurized and its NOR output is depressurized, this allowing the timing volume 98 to discharge via the vented NOR leg of element 93 until the pressure drops sufficiently to allow element 92 to switch back to its preferred state in which its NOR output leg is again pressurized and its OR output is depressurized. In this manner, the OR/NOR outputs of element 92 are alternately pressurized to provide symmetrical square wave signals, as represented in the waveforms (a) and (b) which are shown in the waveform plot of FIG. 10 to occur 180° out of phase. Element 93 is driven by the OR output of element 92 and thus provides an output signal at its OR leg in phase with the output signal at the OR leg of element 92, as represented in the waveform plot (b). This signal is then connected to each transmitter gate 23 and 25 for driving the whistle devices 29, as hereinafter explained. By using the NOR output of element 93 to absorb the timing volume discharge pressure, the NOR output of element 92 produces a much cleaner, less distorted square wave pulse than in the case where only a single element is employed. This is particularly important when the output feeds a one-shot circuit, which requires a sharply defined signal pulse at its input. The necessity of this stable, well shaped signal will become apparent in the operation of the circuitry comprising the sequence control 37, hereinafter described. Elements 94 and 95 of the oscillator circuitry coact to produce a one-shot output for connection with the window gate 28, which is thereby conditioned for a predetermined period to accept a signal from the receiver gates 22 and 24, as hereinafter explained. In response to the NOR output of element 92 being pressurized, the normally pressurized NOR output of element 95 is depressurized in response to the presence of a pressure state signed at its input 100 when the NOR output of element 92 is pressurized. This drop in pressure at the NOR output of element 95 is seen to occur in waveform plot (e) when waveform (a) rises. At the same time, a timing volume 101 is charged via a restrictor 102 resulting in a signal pressure build-up at an input 103 of flip-flop 94 corresponding to an R-C time constant curve, as seen in waveform (c). Since the opposite input 104 of the flip-flop 94 is connected to the OR output of element 92 corresponding to waveform (b), it is out of phase or absent during the period when input 103 is developing. When the pressure at input 103 builds up sufficiently to switch element 94 from its reset condition to its set condition, its connected output 105 is pressurized, as seen in waveform (d). Being connected to input 106 of element 95, the NOR element 95 is switched to its preferred state in which its NOR output becomes pressurized to terminate the one-shot period during which the NOR output of element 95 was depressurized.

It should e noted at this time that the purpose for flip-flop 94 is to absorb the discharge of timing volume 101 similar to the manner in which element 93 absorbs the discharge of volume 98 to perform a similar function of assuring a clean one-shot output.

When element 92 switches states in accordance with the oscillator transition so that the NOR output of element 92 is depressurized and its OR output is consequently pressurized corresponding to waveforms (a) and (b) respectively, flip-flop 94 is switched back to its reset condition in which its output 105 is depressurized, removing the signal from input 106 of element 95, which is thereby conditioned to be switched when the oscillator makes its next transition. Even though inputs 100 and 106 of element 95 are both absent throughout the entire pulse period, element 95 remains in its preferred state in which it is stable so that its NOR output will remain pressurized until the oscillator transition again occurs to reproduce the same cycle of events.

Figure 10:
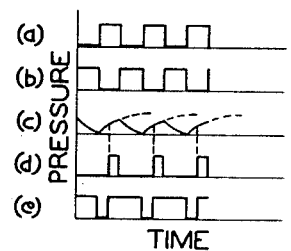
FIG. 10 is a waveform plot of the signal appearing at several significant points in the oscillator circuit of FIG. 2.
Figure 6:
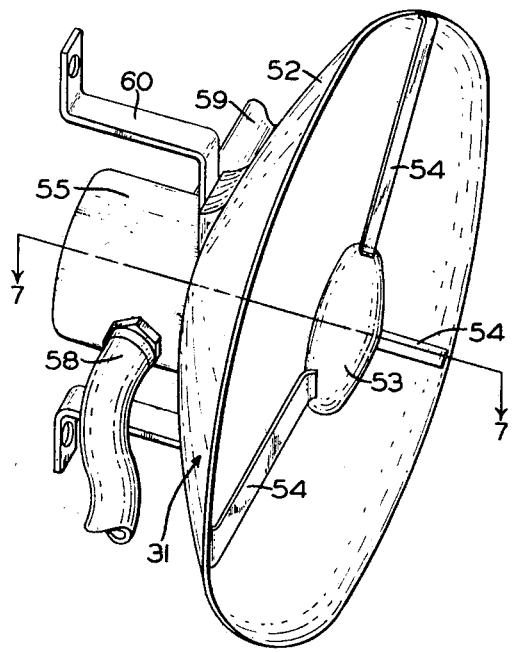
FIG. 6 is an axonometric view of the acoustic receiver of FIG. 1.
Figure 7:
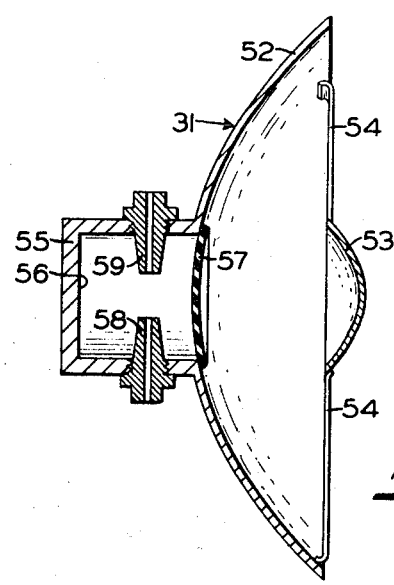
FIG. 7 is a section view of the receiver of FIG. 6 taken along the lines 7—7 of FIG. 6.

This cycle of events is more readily apparent by viewing the relationship of the waveforms shown in FIG. 10 where it can be seen that when waveform (a) makes a transition to a high pressure state, waveform (e) drops to a low level where it remains only a limited time until waveform (d) assumes its high pressure state at some predetermined point along the charging curve of waveform (c), at which point waveform (e) rises to a high pressure level and remains there for the remainder of the high pressure state of waveform (a). When waveform (a) goes to a low level and waveform (b) rises due to transition of the oscillator, waveform (e) will be seen to remain at its high level.

Each transmitter gate 23 and 25 comprises a pair of NOR elements 107 and 108. Element 107 associated with transmitter gate 23 is provided with an input 109 to which is connected the signal X when the car is determined by the direction sensor 18 as having its "X" designated end facing the direction of travel. Similarly, element 107 associated with transmitter gate 25 is provided with an input 109 to which is connected the signal Y generated by the signal sensor 18 when the car in question is determined to be headed with its "Y" designated end facing the direction of travel. The connected NOR output of each element 107 is connected to an input 110 of element 108 in the corresponding transmitter gates 23 and 25, while an output 111 of each element 108 is connected to the inlet port 47 of whistle device 29 associated with transmitter 31 of each transmitter gate 23 and 25. Also connected at another input 112 of element 108 is the OR output of element 93 of the oscillator 27. This oscillator output corresponds to waveform (b) of FIG. 10, it being apparent that when the square wave signal level of the OR output of element 93 rises, input 112 of elements 108 is consequently pressurized; conversely, when the signal level of the OR output of element 93 drops, input 112 of elements 108 is essentially depressurized. Consequently, output 111 of element 108 is alternately pressurized and depressurized to drive the whistle in synchronism with the oscillator. However, the presence of a pressure signal at the NOR output of element 107 of either transmitter gate 23 or 25 in response to the absence of signal Y at gate 23 or signal X at gate 25 will cause the corresponding element 108 to be disabled so that only the whistle associated with the end of the vehicle headed in the forward-going direction is initially provided with fluid pressure power to emit a sonic output, as heretofore explained.

For example, if it is assumed that the "X" designated end of the vehicle is headed in the forward-going direction of travel, sensor 18 will produce an output signal X which will be effective at input 109 of element 107 of transmitter gate 23, thus preventing input 110 of element 108 from being pressurized. Consequently, element 108 of transmitter gate 23 is conditioned to produce an output in synchronism with the oscillator output effective at input 112, thereby causing whistle 29 associated with transmitter gate 23 on the "X" end of the vehicle to sound. At the same time, the fact that signal Y is absent from input 109 of element 107 associated with transmitter gate 25 allows the NOR output of element 107 thereof to be pressurized, this disabling corresponding element 108 so that its output 111 is unable to follow the oscillator. Rearward facing whistle 29 associated with transmitter gate 25 at the "Y" end of the vehicle is thus prevented from sounding.

If the assumed condition were reversed so that the "Y" designated end of the vehicle faced the forward-going direction, sensor 18 would provide signal Y which would result in the whistle associated with transmitter gate 25 being sounded and the whistle associated with transmitter gate 23 would be held inactive by the absence of signal X. In this manner only the whistle facing the direction of travel is able to be initially sounded as the vehicle being classified attempts to "search out" the vehicle with which it is to be coupled.

Receiver gates 22 and 24 associated with respective acoustic receivers 31 located at opposite ends of the vehicle each comprise a pure fluid Schmitt Trigger circuit 113 and a pure fluid NOR element 114. The connected output of Schmitt Trigger 113 provides a control signal at an input 115 of element 114. Another input 116 of element 114 associated with receiver gate 22 is provided by directional signal Y, while input 116 of element 114 associated with receiver gate 24 is provided with directional signal X, the pressure state condition of signals X and Y being established in accordance with the particular end of the vehicle that is facing the forward-going direction of travel. Each Schmitt Trigger circuit 113 is provided with opposing inputs 117 and 118, and is capable of reliably switching from its preferred state in which its connected output is depressurized under conditions where signal pressure across its inputs is substantially equal or a predominate signal exists at input 117 to a state in which its connected output is pressurized in response to a slight pressure differential being established across its inputs by reason of a predominate signal existing at input 118. Input 117 of each Schmitt Trigger is connected to the collector tube 59 of the turbulence amplifier portion of the acoustic receivers 31 which monitors whether or not a signal is being received, as previously explained. Opposing input 118 of each Schmitt Trigger is provided with a bias signal which may be established at either one of two distinct levels for altering the pressure necessary at input 117 to establish a sufficient pressure differential to switch the Schmitt Trigger to its preferred state. Thus, by changing the bias level at input 118, the sensitivity of the receiver 31 is accordingly adjusted. With the bias signal pressure at input 118 being established at the lower of two levels, the differential between inputs 117 and 118 will be quite substantial as long as the fluidic jet flow between the emitter 58 and collector 59 remains laminar, due to maximum pressure recovery being achieved at the collector 59 under conditions of laminar flow. This differential thus established is such that a relatively strong signal must be received within the tuning tube 55 of the acoustic receiver 31 to cause the normally laminar jet to break into such turbulence as to lower the pressure recovery at the collector 59 an amount sufficient to allow the bias signal at input 117 to switch the Schmitt Trigger. This is considered the desensitized state of the receivers 31. On the other hand, a higher bias signal at input 118 reduces the differential required across inputs 117 and 118 of the Schmitt Trigger to switch the Schmitt Trigger. Consequently, a relatively weak signal reception in the tuning tube 55 of the receiver will be monitored as a received signal by reason of only a slight loss of pressure recovery by collector 59, when the jet flow stream is only slightly disturbed, being sufficient to allow the bias signal at input 118 to overcome the signal at input 117. This is considered the sensitized state of receivers 31.

In keeping with the assumed condition in which the "X" designated end of the vehicle is determined to be facing the direction of travel, it will be seen that the absence of signal Y allows the pressure state condition of the connected Schmitt Trigger output effective at input 115 of element 114 to determine pressure state of its output. When a signal reception is registered at receiver 31 associated with receiver gate 22 of sufficient intensity to cause Schmitt Trigger 113 thereof to switch out of its preferred state, input 115 of element 114 is pressurized and its connected NOR output consequently depressurized.

With respect to receiver gate 24 at the opposite Y end of the vehicle, the connected NOR output of element 114 is depressurized by reason of signal X being present at input 116 so that element 114 is locked into a disabled state in which it is unable to respond to the output of Schmitt Trigger 113 when a signal is received thereat.

The connected NOR outputs of elements 114 in the respective receiver gates 22 and 24 are connected to inputs 119 and 120 of a pure fluid OR/NOR element 121 comprising window gate 28. Element 121 is also provided with an input 122 connected to the NOR output of element 95 of the oscillator 27. In the absence of inputs 119 and 120, element 121 is driven by the oscillator signal $(e)$ effective at input 122 so that the pressure state condition of element 121 is alternately switched in synchronism with the oscillator transition. Since signal $(e)$ is only absent for a brief period during each oscillator transition, as evidenced by waveform $(e)$, a signal must be registered by the forward facing receiver during this brief period before element 121 can pass a signal to the remainder of the circuitry. The duration the oscillator signal at input 122 of window gate 28 is present is calculated to correspond to the time required for a signal emitted by transmitter 30 and traveling at the speed of sound to traverse a predetermined distance and return through the same distance. This predetermined distance is selected to establish a range within which the brakes of the vehicle being classified are to apply in the event another vehicle is detected in this range so a safe coupling between the vehicles will ensue. If the reflected signal is not registered at the appropriate receiver 31 within the allotted period, one of the inputs 119 or 122 of element 121 will be pressurized and its OR output will be maintained in a pressurized condition. As the vehicle, in moving down the "hump" and onto its appropriate destination track, receives a reflected signal from the vehicle with which it is to be coupled within the window gate period, as provided by the absence of input 122 at element 121, all the inputs thereto will be momentarily absent allowing the OR output of element 121 to be depressurized. When the window gate period expires, i.e., when signal $(e)$ reappears at input 122 on the next successive oscillator transition, the OR output of element 121 will again be pressurized. It will therefore be apparent that as long as the signals being transmitted during alternate oscillator transitions are received within a predetermined gating period during each corresponding oscillator transition, the vehicle is determined to be within a prescribed distance of the vehicle with which it is to couple. Referring to the waveform plot of FIG. 10, it will be seen that the whistle signal transmitted during the initial pulse of waveform $(a)$ must be received within the initial brief window gate period when the signal level of waveform $(e)$ drops to its low level. If the distance between the vehicles to be coupled is greater than the predetermined distance between the vehicles to be coupled is greater than the predetermined distance so that the whistle signal is not received, with respect to time, until the next window gate period, its intensity will be degraded sufficiently, due to the greater distance it must necessarily be traveling, as to be unable to overcome the bias signal at input 118 of the receiver gate 22, even when the receiver is set up to operate at normal sensitivity. The ability to achieve a fine adjustment of the bias level at receiver gates 22 and 24 so that these degraded signals will be of insufficient intensity to be recognized is provided by an adjustable bleed restrictor 123 associated with input 118 of each Schmitt Trigger 113.

At timer gate 32, the OR output of element 121 is fed to an input 124 of a pure fluid NOR element 125 and to an input 126 of a pure fluid OR/NOR element 127. The OR output of element 127 is connected to an input 128 of another NOR element 129 also in the circuit of timer gate 32. The timer gate circuitry further includes a pure fluid flip-flop device 130 having an input 131 connected to the NOR output of element 125 and an opposing input 132 connected to the NOR output of element 127.

Interrelated with the timer gate 32 is a timer device 33 comprising a pure fluid OR/NOR element 133 and a timing volume 134 connected to an input 135 of element 133 and to a source of fluid pressure effective at an input 136 as provided by reservoir 16 when the system start signal is established. Since it requires but a very short period following start up of the system to charge timing volume 134 via a restrictor 137 to a sufficient pressure level to cause the signal at input 135 to switch element 133 such that it OR output is pressurized and its NOR output is depressurized this will be considered the normal condition following start up of the system. The OR output of element 133 is connected to an input 138 of element 125 which is consequently switched to a condition in which its connected NOR output is depressurized in the normal condition of the timer. At the same time, the NOR output of element 133 is connected to an input 139 of element 127 and, being depressurized in the normal condition of the timer, allows the pressure state condition of the outputs of element 127 to be alternate in accordance with the signal effective at its input 126, which is pressurized until a reception signal occurs during the window gate period. Consequently, input 132 of flip-flop 130 is depressurized by way of the depressurized NOR output of element 127 in the normal condition of the timer. At the same time, the OR output of element 127 pressurizes input 128 of element 129 which is consequently disabled.

When the first signal reception occurs during the window gate period, all inputs to window gate element 121 are depressurized as is the OR output thereof. The signal at input 126 of element 127 thus disappears along with input 139, allowing its NOR output to pressurize input 132 of flip-flop 130. Since the opposing flip-flop input 131 is depressurized by reason of input 138 being present, an output 140 of flip-flop 130 is pressurized and an output 141 thereof is depressurized. The signal at output 140 passes via a restrictor 142 to input 118 of Schmitt Trigger 113 at receiver 22 and via a restrictor 143 to input 118 of Schmitt Trigger 113 of receiver 24, said restrictors 142 and 143 being selected to provide a bias signal at the respective inputs 118 to condition the receivers to operate at their normal sensitivity corresponding to the normal state of the timer 33. The desensitized operating condition of the receiver will be discussed later.

As long as the vehicle remains within a predetermined distance of the vehicle with which it is to couple, it will be apparent that reflected signals will continue to be received by the forward facing receiver 31 during successive window gate periods. Element 127 will therefore alternate its pressure state condition with each transition of the window gate signal at input 126. Since flip-flop 130 is a memory device, its previous pressure state condition will be maintained during transition of element 127.

Provided there is no signal present at an input 144 of element 129, its pressure state output condition will follow transition of the signal effective at its input 128. If a signal is presented at input 144, element 129 will be disabled so that its connected NOR output will be maintained in a depressurized state irrespective of the pressure state condition of input 128. The pressure state condition of input 144 is determined initially by whether the speed of the vehicle is greater or less than a predetermined rate, as established by speed threshold circuit 35. A pure fluid Schmitt Trigger circuit 145 is provided with an input 146 to which is connected a bias input representing a reference rate of speed above which the vehicle brakes are to be applied. An opposing input 147 is subject to the output of rate sensor 36 which essentially comprises a plurality of pure fluid devices arranged to integrate the pulses produced by axle generator 20. Rate sensor 36 produces an analog signal corresponding to the frequency at which the pulses are produced by the axle generator 20, which may be of the well known interruptable jet configuration in which the frequency of pulses produced is proportional to the rate of rotation of the axle on which the axle generator is mounted. Consequently, the output of the rate sensor 36 is an analog signal the amplitude of which is proportional to vehicle speed. Since details of a pure fluid speedometer circuit similar to rate sensor 35 and driven by an interruptable jet arrangement similar to axle generator 20 is fully shown and described in my copending U.S. Pat. application, identified by Ser. No. 734,073, filed June 3, 1968, no further description of the rate sensor 35 is believed necessary. Since the amplitude of the bias signal at input 146 of Schmitt Trigger 145 is adjusted in accordance with the predetermined speed threshold to be detected, it will be seen that an output 148 of the Schmitt Trigger will be pressurized until the amplitude of the rate signal effective at the Schmitt Trigger input 147 exceeds the bias signal at input 146, at which time output 148 will be depressurized indicating that the vehicle speed is above the preselected rate.

The Schmitt Trigger output 148 is connected to an input 149 of a pure fluid OR element 150, also in speed threshold circuit 35. An OR output 151 of element 150 is connected to input 144 of element 129 so that when pressurized in accordance with pressurization of Schmitt Trigger output 148, element 129 will be maintained in a disabled state in which it is unable to respond to the signal passed by the window gate, thus indicating that even though the vehicle is within a predetermined distance of the vehicle in question, its speed is such that no brake application is necessary to assure a safe coupling. It is thus apparent that a determination of the vehicle being within a prescribed distance of a vehicle with which it is to couple and the vehicle speed exceeding a preselected limit is required before any braking action will be taken.

If the vehicle speed exceeds a preset limit as detected by Schmitt Trigger 145, input 149 of element 150 is depressurized, as is output 151 and consequently input 144 of element 129, which is thereby conditioned to establish a pressure state condition at its NOR output in accordance with the transition of signal pressure at its input 128.

The counter 34 comprises a two-stage, pure fluid binary counter, the first stage being represented by reference numeral 152, and the second stage by numeral 153. A clock input 154 of the counter first stage 152 is provided by the NOR output of element 129 while a clock input 155 of the counter second stage 153 is provided by the alternate pressure state condition of a first stage output 156. Also included in counter 34 is a pure fluid OR/NOR element 157 having an input 158 connected to an output 159 of the counter first stage and an input 160 connected to an output 161 of the counter second stage. A third input 162 of element 159 is connected to output 151 of element 150.

As long as any one of the inputs 158, 160 or 162 is pressurized, the OR output of element 157 will be pressured and, being connected to pilot port connection 38 of application and release valve 11 (FIG. 1), will position valve 11 to effect a release condition of the brakes. This will be the case when the car speed is below the preset threshold rate, or when the counter has not yet registered the required three clock pulses at the first stage input 154. The normal operation of a binary counter is such that the corresponding outputs of the first and second stages reflect identical pressure state conditions only in response to the counter having received three clock pulses. Consequently, inputs 158 and 160 of element 157 are each depressurized via the corresponding outputs 159 and 161 respectively of counter stages 152 and 153 when three signal transitions of the window gate 28 have been passed by element 129 to the counter. Since input 144 of element 129 must necessarily be depressurized in accordance with the vehicle speed being above its preset threshold level before element 129 is able to pass the window gate pulse, it follows then that input 162 of element 157 will also be depressurized at count three. With each input 158, 160 and 162 thus depressurized, the pressure state condition of element 157 is switched so that its OR output is depressurized and its NOR output is pressurized. A "set" input S of each counter stage 152 and 153 is connected to the NOR output of element 157 so that when pressurized at a count of three, the counter stages will be locked in their present state to maintain element 157 in a condition calling for a brake application by reason of its OR output being depressurized. The OR output of element 157 is connected to input 38 of interlock valve 11 and being depressurized, permits spring operator 39 to position the spool of valve 11 to communicate port connections 12 and 14. Fluid pressure stored in reservoir 16 is thus connected via line 15, valve 11, and valve 6 to the brake cylinder device 3 to allow the reservoir and brake cylinder pressures to equalize and thereby produce a brake application on the car. At the same time as the OR output of element 157 is depressurized, the NOR output is pressurized, thereby causing an input 163 of element 107 at each transmitter 23 and 25 to be pressurized. This results in the directional information provided by signals X or Y at inputs 109, which previously allowed only the whistle associated with the direction of travel to sound, being suppressed to allow the whistles associated with each transmitter 23 and 25 to sound when a brake application occurs.

The desirability of this feature will now be explained by assuming that a cut of cars, as opposed to a single car, have been pushed over the "hump" for classification and that each car of the string of cars being classified is provided with the car classification system comprising the invention. Following the system start signal at input 136 of each car, as previously explained, the pressure state condition of element 133 of timer 33 is such that the NOR output of element 133 is pressurized and the OR output is depressurized. This condition exists until such time as the pressure in reservoir 134 builds up sufficiently to switch element 133. Consequently, input 138 of element 125 of timer gate 32 is depressurized.

Since each trailing car in the cut of cars will sense the presence of the car immediately coupled ahead of it as a target car upon reception of the first reflected signal from its forward facing transmitter, the OR output of window gate element 121 and consequently input 124 of timer gate element 125 are depressurized, thereby resulting in pressurization of input 131 of flip-flop element 130.

Concurrently, input 132 of flip-flop 130 is depressurized by reason of input 139 of timer gate element 127 being pressurized until timer 33 times out. Consequently, flip-flop 130 is switched from its previous state so as to pressurize its output 141 which supplies fluid pressure via a restrictor 163 to input 118 of element 113 in receiver gate 22 and via a restrictor 164 to input 118 of element 113 in receiver gate 24. The parallel restrictors 163 and 164 are chosen so that the bias signal at inputs 118 are lower than the normal bias signal at inputs 118 are lower than the normal bias signal provided when flip-flop output 140 is pressurized to supply inputs 118 via restrictor 142 and 143. This lowered bias signal serves to desensitize the trailing cars receivers so that the signals reflected off the car coupled immediately ahead of the trailing car will not be of sufficient intensity to disturb the interruptable jet stream flowing across the tuning tube sufficiently to reduce the pressure recovery at collector 59 enough to cause Schmitt Trigger 113 in receiver gate 22 to be triggered. Consequently, the OR output of element 113 will remain pressurized to enable element 114 which, in turn, prevents the window gate element 121 from passing a signal to the timer gate 32. Consequently, a brake application signal from counter 34 can not be realized and the cut of cars is able to continue rolling free down the classification yard until such time as a brake application signal is provided on the lead car, as hereinbefore explained.

Now when the rearward facing whistle on the lead car is activated, in response to a brake application signal having been received, as previously explained, its proximity with the car coupled directly behind the lead car results in the sonic signals emitted being of sufficient intensity to overcome the desensitized condition of the trailing cars forward facing receiver, due to the fact that the receiver is picking up energy waves which are not reflected but which are received directly from the lead car's rearward-facing transmitter. The trailing car's brakes are thus applied, as explained previously, and at the same time its rearward-facing whistle is activated by the brake application signal to subsequently overcome the desensitized condition of the next car's forward-facing receiver. In this manner, the brakes on each car of a cut of cars are applied sequentially in response to the lead car sensing a target car within a predetermined distance when the speed of the cut of cars exceeds a predetermined limit so that each car shares in slowing the cut of cars to a safe coupling speed.

When the brakes on a single car or each car of a cut of cars are applied through control of application and release valve device 11, as previously explained, so that the car or cut of cars is slowed to a speed below that which is determined to be a safe coupling speed, Schmitt Trigger input 147 from the rate sensor 36 will fall below the bias signal at the opposing Schmitt Trigger input 147 from the rate sensor 36 will fall below the bias signal at the opposing Schmitt Trigger input 146, resulting in output 148 being pressurized. Consequently, element 150 is enabled to pressurize its output 151, thus pressurizing input 162 of element 157 which is reset. The OR output of element 157 is accordingly pressurized to force application and release valve 11 to its release condition in which the brake cylinder pressure is vented to atmosphere and the brakes are thus released to allow the car to roll into a soft coupling with the target car from which the source of transmitted signals were reflected during the searching cycle of operation.

Also connected to pressurized output 151 of element 150 at this time are the reset inputs R of counter stages 152 and 153. When the vehicle speed drops below the speed threshold limit and the brakes are released, reset inputs R are pressurized and the counter stages are simultaneously reset, thus again requiring a count of three pulses before the brakes can be reapplied in the event the vehicle speed again exceeds the preset limit before the coupling is actually accomplished.

As explained above, the counter 34 provides a brake application signal in consequence of a predetermined number of input pulses being received by way of window gate 28 and timer gate 32. This predetermined number of three input pulses are required to assure that the signals being received by the counter are not spurious pulses or arising from an object momentarily in the path of the vehicle. Since the counter is unable to detect whether or not the required input pulses are consecutive, a circuit comprising the sequence block 32 is provided. This circuit accomplishes the task of requiring that the input signals pulsing the counter are consecutively received by generating a tentative counter reset signal and then destroying it if an acoustic signal is being received within the window gate period. If no acoustic signal is received, the tentiative reset signal is allowed to become a real one, whereby the counters are reset. An acoustic signal must therefore be received during consecutive window gate periods until the required number of pulses are received by the counter in order to produce the brake application signal. Included in this circuit is a pure fluid-one shot element 166, a pure fluid flip-flop element 167, and a pure fluid NOR element 168. The pressure state condition of an input 169 of element 166 is determined in accordance with the alternate states of the oscillator, being connected to the NOR output of oscillator element 92. When input 160 is pressurized, the one-shot OR output, which is connected to an input 170 of flip-flop element 167, is momentarily pressurized, becoming depressurized after a predetermined duration, as determined by the one-shot characteristic, irrespective of the pressure state condition of input 169. This results in flip-flop 167 being set so as to depressurize its connected output 171 provided an opposing input 172 is depressurized. Input 172 is connected to the NOR output of window gate element 121 and is therefore maintained depressurized as long as a signal reception is not recognized by one of the receivers. Since an input 173 of NOR element 168 is connected to flip-flop output 171, it will remain depressurized until a signal reception is recognized and acted upon by window gate element 121. NOR element 168 is also provided with an input 174 which is connected to the NOR output of oscillator element 92 so that as long as input 173 remains depressurized, element 168 is able to switch states in accordance with the transitions of the oscillator. Connected to the NOR output of element 168 is an input 175 of element 150 in speed threshold circuit 35.

Now if the vehicle speed is above a limit corresponding to the bias level effective at Schmitt Trigger 145 so that output 148 thereof and consequently input 149 of element 150 is depressurized, output 151 thereof will assume a pressure state condition determined by the state of element 168 of sequence block 37, which alternates with the oscillator transitions. Each time output 151 is pressurized, the counter reset ports R associated with counter stages 152 and 153 are accordingly pressurized to reset the counter, thus preventing the counter from accumulating the required number of clock pulses to produce a brake application signal.

Each time a signal reception is recognized by the activated receiver gate 22 or 24 within the window gate period, the NOR output of window gate element 121 is pressurized to provide a signal at input 172 of flip-flop 167. When the one-shot signal at input 170 of flip-flop 167 disappears, the flip-flop is reset to a condition in which its output 171 and consequently input 173 of element 168 is pressurized. This results in NOR element 168 being disabled so that connected NOR output and consequently input 175 of speed threshold element 150 is depressurized, whereby element 150 is conditioned to respond to the speed threshold signal effective at input 149 thereof. When the vehicle speed exceeds a predetermined limit, output 151 of element 150 will be depressurized, allowing the counter 34 to proceed to accumulate input pulses as long as a signal reception continues to be recognized and passed on by window gate element 122 in sequence with the oscillator transition so that the tentative counter reset signal is destroyed. When the predetermined number of three pulses have been accumulated by the counter, the brake application signal will be provided, as previously explained.

Having now described the invention what I claim as new and desire to secure by Letters Patent, is:

1. An onboard vehicle brake control system for limiting the free-rolling movement of said vehicle to a safe coupling speed comprising:
  a. object sensing means for signalling the presence of another vehicle in the path of travel of said vehicle within a predetermined maximum distance,
  b. speed sensing means for signalling movement of said vehicle at a rate in excess of a predetermined rate,
  c. timer means for providing a predetermined time duration during which period said signalling of said object sensing means indicates such close proximity of another vehicle with said vehicle as to indicate a coupled condition therebetween, said timer means including means responsive to said signalling of said object sensing means within said time duration to prevent further signalling of said object sensing means, and
  d. brake control means operative to apply vehicle brakes only during concurrent signalling of said object sensing means and said speed sensing means.

2. The system as recited in claim 1 wherein said object sensing means comprises:
  a. first object sensing means operative in accordance with one direction of travel of said vehicle,
  b. second object sensing means operative in accordance with the opposite direction of travel of said vehicle,
  c. direction sensing means for detecting the direction of travel of said vehicle, and
  d. transmitter selector means responsive to said direction sensing means to select for operation one of said first or said second object sensing means and further responsive to application of vehicle brakes to subsequently select the other one of said first or second object sensing means for operation concurrent with operation of said first selected object sensing means.

3. The system as recited in claim 2, in which:
a. said first and second object-sensing means each includes:
  i. a transmitter for emitting wave energy signals having a predetermined frequency,
  ii. receiver means normally operable in a sensitized mode of operation to provide an output signal only when the received signal is above a first level of intensity and switchable to a desensitized mode of operation to provide an output signal only when the received signal is above a second level of intensity greater than said first level of intensity,
  b. said means for preventing said object-sensing means from further signalling the presence of another vehicle including means for switching said receiver means to said desensitized mode of operation in response to said signalling of said object-sensing means within said time duration period.

4. The system as recited in claim 3, further comprising:
  a. oscillator means for providing a time base consisting of alternate pulse periods, and
  b. said transmitter selector means including first gate means for enabling said oscillator means to periodically drive the selected one or both of said transmitters.

5. The system as recited in claim 4, further comprising:
  a. pulse shaper means responsive to said oscillator means for providing a gating signal of predetermined duration during said alternate pulse periods,
  b. detector gate means operatively responsive to said gating signal to establish a gating interval, and
  c. second gate means responsive to said direction sensing means for selectively connecting said signal provided by said receiver means of said first or said second object sensing means to said detector gate means to provide a coincidence signal in accordance with signalling of said object sensing means during said gating interval.

6. The system as recited in claim 5, wherein said pulse shaper means is comprised of pure fluid circuitry for producing a pulse signal of predetermined duration to provide said gating signal in accordance with the time required for said emitted signal to be reflected through a distance corresponding to said predetermined maximum distance.

7. The system as recited in claim 4 wherein each of said transmitters comprises:
  a. sonic signal emitting means responsive to said first gate means for providing said wave energy signals, and
  b. reflector means for directing said wave energy signals in the direction of travel of said vehicle.

8. The system as recited in claim 3 wherein said receiver means each comprises:
  a. a tuning tube for conditioning wave energy signals,
  b. reflector means for receiving signals of sonic wave energy and directing said sonic wave energy signals to said tuning tube,
  c. sensor means arranged with said tuning tube for sensing only said received sonic signals corresponding to said predetermined frequency.

9. The system as recited in claim 8 wherein said sensor means comprises:
  a. a collector disposed at a location along the longitudinal axis of said tuning tube corresponding to the point where maximum disturbance of the wave signals corresponding to said predetermined frequency is effective, and
  an emitter aligned opposite said collector to emit a continuous stream of fluid pressure transverse of said tuning tube, said stream having a normally laminar flow condition affording maximum fluid pressure recovery of said collector in response to wave disturbances less than said maximum disturbance and having a turbulent flow condition affording fluid pressure recovery by said collector less than said maximum recovery.

10. An onboard vehicle brake control system for limiting the free-rolling movement of said vehicle to a safe coupling speed comprising:
  a. direction sensing means for detecting the direction of travel of said vehicle,
  b. object sensing means for signalling detection of another vehicle in the path of travel of said vehicle within a predetermined maximum distance,
  c. said object sensing means, comprising,
    i. a fluid pressure oscillator responsive to said direction sensing means for emitting sonic signals having a predetermined frequency in the direction of travel of said vehicle, said oscillator comprising,
ii. a body having an inlet port for receiving a supply of fluid pressure,
iii. a pair of cylindrical chambers subject selectively to a stream of fluid pressure provided by a passageway communicated with said inlet port, said stream of fluid pressure having a normal direction of flow toward one of said chambers so as to establish a fluid vortex therein adapted to impinge said stream of fluid pressure to deflect it toward the other one of said chambers wherein a fluid flow vortex is established until such time as the vortex in said one chamber dissipates sufficiently to allow said stream of fluid pressure to resume its normal direction of flow,
iv. an outlet orifice in said other chamber for periodically emitting pulses of fluid pressure wave energy in accordance with said fluid flow vortex being periodically provided therein to provide said sonic signals having a predetermined frequency, and
v. receiver means providing a signal in response to reception of said sonic signals having a predetermined frequency,
d. speed sensing means for signalling detection of movement of said vehicle at a rate in excess of a predetermined rate, and
e. brake control means for applying vehicle brakes in response to signalling of said object sensing means and said speed sensing means.

11. An onboard vehicle brake control system for limiting the free-rolling movement of said vehicle to a safe coupling speed comprising:
a. direction sensing means for detecting the direction of travel of said vehicle,
b. object sensing means for signalling detection of another vehicle in the path of travel of said vehicle within a predetermined maximum distance including,
i. fluid pressure oscillator means responsive to said direction sensing means for emitting sonic signals having a predetermined frequency in the direction of travel of said vehicle,
ii. receiver means comprising:
1. tuning tube means for conditioning said emitted sonic signals,
2. parabolic reflector means for receiving signals of sonic wave energy and directing said signals of sonic wave energy to said turning tube means,
3. sensor means arranged with said tuning tube to respond only to said received sonic signals having a frequency corresponding to said predetermined frequency to provide an indication of a signal reception,
c. speed sensing means for signalling detection of vehicle movement at a rate in excess of a predetermined rate, and
d. brake control means for applying vehicle brakes in response to signalling of said speed sensing means and said object sensing means.

* * * * *